(12) United States Patent
Satoji et al.

(10) Patent No.: US 8,079,760 B2
(45) Date of Patent: Dec. 20, 2011

(54) FLUID BEARING DEVICE

(75) Inventors: Fuminori Satoji, Mie-ken (JP); Kenji Itou, Mie-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/730,722

(22) Filed: Mar. 24, 2010

(65) Prior Publication Data

US 2010/0177998 A1 Jul. 15, 2010

Related U.S. Application Data

(62) Division of application No. 10/557,257, filed as application No. PCT/JP2004/010177 on Jul. 9, 2004, now Pat. No. 7,690,845.

(30) Foreign Application Priority Data

Jul. 23, 2003 (JP) .................................. 2003-278414

(51) Int. Cl.
*F16C 32/06* (2006.01)

(52) U.S. Cl. .......................... 384/100; 384/107; 384/130

(58) Field of Classification Search .................. 384/100, 384/105, 107, 111–115, 120–123, 130; 29/898.049
See application file for complete search history.

(56) References Cited

U.S. PATENT DOCUMENTS

| | | | | |
|---|---|---|---|---|
| 4,583,875 A | * | 4/1986 | Manusch et al. | 401/133 |
| 6,146,577 A | * | 11/2000 | Yamaki et al. | 264/500 |
| 6,717,310 B2 | * | 4/2004 | Yoshikawa et al. | 384/107 |
| 6,851,859 B2 | * | 2/2005 | Takehana et al. | 384/100 |
| 7,025,505 B2 | | 4/2006 | Komori et al. | |
| 7,147,376 B2 | * | 12/2006 | Shimizu et al. | 384/107 |
| 7,267,484 B2 | * | 9/2007 | Satoji et al. | 384/112 |
| 7,556,433 B2 | * | 7/2009 | Kurimura et al. | 384/100 |
| 2003/0113045 A1 | | 6/2003 | Fujinaka | |
| 2003/0169952 A1 | | 9/2003 | Yamashita et al. | |
| 2004/0028299 A1 | | 2/2004 | Shishido et al. | |
| 2004/0258335 A1 | * | 12/2004 | Shimizu et al. | 384/100 |
| 2005/0044714 A1 | | 3/2005 | Yamashita et al. | |

FOREIGN PATENT DOCUMENTS

| | | |
|---|---|---|
| JP | 9-67461 A | 3/1997 |
| JP | 11-42514 A | 2/1999 |
| JP | 11-55888 A | 2/1999 |
| JP | 2000-291648 A | 10/2000 |
| JP | 2005042838 A * | 2/2005 |
| WO | WO 02/10602 A1 | 2/2002 |
| WO | WO 03/027521 A1 | 4/2003 |

* cited by examiner

*Primary Examiner* — Marcus Charles

(74) *Attorney, Agent, or Firm* — Arent Fox, LLP

(57) ABSTRACT

An object is to reduce manufacturing cost of a housing, and enable to disuse an adhesive in fixation portions between a housing and a bearing sleeve and the like.

A housing 7 is made of resin material, which comprises a liquid crystal polymer (LCP) as crystalline resin blended with carbon nanotubes in a blending ratio of 2 to 35 vol % as a conductive filler, by injection molding. A bearing sleeve 8, which is inserted into the inner peripheral surface 7c of the housing 7, is secured to the housing 7 by ultrasonic welding.

11 Claims, 3 Drawing Sheets

FLUID BEARING DEVICE

CROSS-REFERENCE TO RELATED APPLICATIONS

This application is a divisional application of U.S. patent application Ser. No. 10/557,257, filed Oct. 11, 2006, which issued as U.S. Pat. No. 7,690,845, on Apr. 6, 2010; and which was a National Stage application of International Application No. PCT/JP2004/010177, filed Jul. 9, 2004, claiming the benefit of priority of Japanese Patent Application No. 2003-278414, filed Jul. 23, 2003. The disclosures of the prior applications are hereby incorporated by reference herein in their entirety.

TECHNICAL FIELD

The present invention relates to a fluid bearing device which supports an axial member in a non-contact manner by an oil film of a lubricating oil generated in a radial bearing gap. This bearing device is ideal for use in information equipment, including the spindle motors for magnetic disk devices such as HDD and FDD, optical disk devices for CD-ROM, CD-R/RW, DVD-ROM/RAM, etc. and magneto-optical disk devices for MD, MO, etc., the polygon scanner motors in laser beam printers (LBP), or small-scale motors for electrical equipment such as axial flow fans.

BACKGROUND ART

Speedup, cost reduction, noise reduction, and the like are required of the foregoing various motors, in addition to high accuracy in rotation. One of components to determine required performance is a bearing for supporting a spindle of the motor. In recent years, a fluid bearing having superior characteristics in the foregoing required performance is contemplated using, or actually used.

This type of fluid bearing is broadly divided into a dynamic pressure bearing and a so-called cylindrical bearing (a bearing the bearing surface of which is in the shape of a perfect circle). The dynamic pressure bearing is provided with dynamic pressure generation means which makes a lubricating oil in a bearing gap generate dynamic pressure. The cylindrical bearing is not provided with such dynamic pressure generation means.

Taking the case of a fluid bearing device which is installed in the spindle motor of the disk device such as the HDD and the like, for example, the fluid bearing device is provided with a radial bearing portion for supporting an axial member in a non-contact manner rotatably in a radial direction, and a thrust bearing portion for supporting the axial member rotatably in a thrust direction. As the radial bearing portion, a dynamic bearing, which is provided with grooves (dynamic pressure generating grooves) in the inner peripheral surface of a bearing sleeve or in the outer peripheral surface of the axial member to generate dynamic pressure, is used. As the thrust bearing portion, for example, a dynamic bearing, which is provided with dynamic pressure generating grooves in both end faces of a flange part of the axial member, or in surfaces opposed thereto (an end face of a bearing sleeve, an end face of a thrust member fixed on a housing or the like), is used (refer to, for example, Japanese Patent Laid-Open Publication No. 2000-291648). Otherwise, there are cases where a bearing (so-called pivot bearing), which supports one end face of the axial member in a contact manner by a thrust plate, is used as the thrust bearing portion (refer to, for example, Japanese Patent Laid-Open Publication No. 11-191943).

The bearing sleeve is generally fixed in a predetermined position of the inner periphery of the housing. A seal member is disposed on an opening of the housing in most cases, in order to prevent the lubricating oil in an internal space of the housing from leaking to the outside.

The fluid bearing device having a construction described above comprises parts such as a housing, a bearing sleeve, an axial member, a thrust member, and a seal member, and an effort is under way to increase the accuracy of finishing and assembling of each part, for the purpose of ensuring high bearing performance, which is required in accordance with increase in the performance of the information equipment more than ever. Demand for cost reduction on this type of fluid bearing device, on the other hand, has increasingly become stringent in accords with a tendency toward drop in price of the information equipment.

One of important points for reducing cost of this type of fluid bearing device is efficiency in an assembling process. Namely, the housing and the bearing sleeve, the housing and the thrust member, and the housing and the seal member are generally bonded to each other by use of an adhesive in most cases. However, it takes relatively long time from application of the adhesive to solidification thereof, so that bonding is part of the reason of reducing the efficiency in the assembling process. Also, there is concern about the occurrence of outgassing due to the adhesive, as well as the possibility of degradation of adhesion with a lapse of time.

DISCLOSURE OF THE INVENTION

An object of the present invention is to provide a fluid bearing device at further lower cost by reducing manufacturing cost of a housing in this type of fluid bearing device, and by enabling to disuse an adhesive in a fixation portion between a housing and a bearing sleeve and the like to increase efficiency in an assembling process.

Another object of the present invention is to provide a fluid bearing device which can restrain the occurrence of outgassing from a fixation portion between parts and degradation of adhesion with a lapse of time.

To achieve the objects described above, the present invention provides a fluid bearing device comprising a housing, a bearing sleeve disposed inside the housing, an axial member inserted into an inner peripheral surface of the bearing sleeve, and a radial bearing portion for supporting the axial member in a non-contact manner in a radial direction by an oil film of a lubricating oil formed in a radial bearing gap between the inner peripheral surface of the bearing sleeve and an outer peripheral surface of the axial member. In this fluid bearing device, the housing is made of one type of resin material selected from among amorphous resin blended with a filler in a blending ratio of 3 to 35 vol %, and crystalline resin blended with a filler in a blending ration of 2 to 30 vol %, and the bearing sleeve is fixed to the housing by welding.

The housing made of resin can be formed by molding such as injection molding and the like. Thus, it is possible to manufacture the resin housing at lower cost as compared with a metal housing, which is formed by machining such as turning and the like. Also the resin housing can secure relatively high accuracy as compared with the metal housing formed by press working.

By fixing the bearing sleeve on the housing by use of welding, it is possible to increase working efficiency as compared with conventional fixation using an adhesive. Also it is possible to prevent or restrain the occurrence of outgassing from a fixation portion and degradation of adhesion with a lapse of time.

Herein, "welding" refers to a phenomenon in which a joint surface of one or both of two members to be joined is melted and then solidified to be fixed. It is possible to appropriately select and adopt means for welding from among, for example, ultrasonic welding, vibration welding, high frequency induction heating welding, hot plate welding, and the like in accordance with material of the member to be joined, a joint condition, and other various conditions. Generally, the ultrasonic welding is a method for generating high frictional heat in a part of a resin product by applying ultrasonic vibration and welding pressure at the same time, in order to melt and fix a joint surface. The vibration welding is a method for melting and fixing the joint surfaces by vibrating the two members to be joined in a predetermined direction with applying pressure. The high frequency induction heating welding is a method by which the member to be joined is subjected to a high-frequency magnetic field. Heat is generated by overcurrent loss, and hence the joint surface is melted and fixed. The hot plate welding is a method by which a heat source (a hot plate) at high temperature is brought into contact with the joint surface of a resin product, in order to melt and fix the joint surface. Of these welding methods, the ultrasonic welding is especially preferable, because the ultrasonic welding needs just simple equipment and its welding operation can be carried out in a short time.

When the housing is made of amorphous resin, it is necessary to consider the following matters. Namely, the amorphous resin is generally superior in the ability of welding, when it is welded by the ultrasonic welding and the like. Thus, when the bearing sleeve is fixed on the housing made of amorphous resin by welding, it is possible to provide a firm and stable fixation state between them. The amorphous resin, on the other hand, tends to be inferior in oil resistance to the crystalline resin. If stress such as residual stress due to welding and the like is applied and the amorphous resin housing is in contact with the lubricating oil charged into an internal space, there is a possibility that a stress crack occurs in the housing. This stress crack is a phenomenon, in which a crack (sometimes called "solvent crack") occurs, when the resin makes contact with the lubricating oil (solvent) under predetermined stress, and the lubricating oil penetrates and diffuses into the resin. The crack due to contact with the lubricating oil hardly occurs under no stress, but such a phenomenon may occur under the predetermined stress.

Thus, to prevent the degradation of the housing due to the stress crack, a blending ratio of the filler into the amorphous resin is regulated in a range equal to or less than 35 vol %. The amorphous resin is generally superior in the ability of welding, as described above, but the ability of welding tends to decrease with increase in blending quantity of the filler. Thus, if the blending quantity is too much, it becomes necessary to enhance a welding condition such as welding time and the like, in order to secure required fixation strength of the fixation portion (welded portion). Since the residual stress in welding increases in accordance therewith, resistance to the stress cracking of the housing becomes insufficient. Regulating the blending ratio of the filler into the amorphous resin equal to or less than 35 vol % makes it possible to prevent inconvenience like this, and secure favorable resistance to cracking of the housing. If the blending quantity of the filler is too little, on the other hand, an original purpose of blending the filler, in other words, a purpose of providing characteristics such as required strength, dimensional stability against variation in temperature, conductivity, and the like to the housing is lost. Therefore, the blending ratio of the filler into the amorphous resin is regulated in a range equal to or more than 3 vol %, in order to secure the required characteristics of the housing.

The crystalline resin is superior in the oil resistance, but inferior in the ability of welding to the amorphous resin. Thus, in a case that the housing is made of the crystalline resin, if the blending quantity of the filler is too much, required fixation strength of the fixation portion (welded portion) cannot be secured due to decrease in the ability of welding. Therefore, the blending ratio of the filler into the crystalline resin is regulated in a range equal to or less than 30 vol %, in order to secure the necessary ability of welding and the required fixation strength of the fixation portion (welded portion). If the blending quantity of the filler is too little, on the other hand, an original purpose of blending the filler, in other words, a purpose of providing characteristics such as required strength, dimensional stability against variation in temperature, conductivity and the like to the housing is lost. Therefore, the blending ratio of the filler into the crystalline resin is regulated in a range equal to or more than 2 vol %, in order to secure the required characteristics of the housing.

The present invention further provides a fluid bearing device comprising a housing, a bearing sleeve disposed inside the housing, an axial member inserted into an inner peripheral surface of the bearing sleeve, a radial bearing portion for supporting the axial member in a non-contact manner in a radial direction by an oil film of a lubricating oil formed in a radial bearing gap between the inner peripheral surface of the bearing sleeve and an outer peripheral surface of the axial member, and a thrust bearing portion for supporting the axial member in a thrust direction. In this fluid bearing device, the housing may be made of the foregoing resin material, and at least one of the bearing sleeve and a thrust member composing the thrust bearing portion may be fixed on the housing by welding. When only one of the bearing sleeve and the thrust member is fixed by welding, a method such as insert molding, press fitting and the like may be adopted as a method for fixing the other one on the housing. By, for example, molding (injection molding and the like) the housing out of the foregoing resin material with the use of an insert part of the bearing sleeve, it is possible to fix the bearing sleeve on the housing without additional fixing operation.

Further the present invention provides a fluid bearing device comprising a housing, a bearing sleeve disposed inside the housing, an axial member inserted into an inner peripheral surface of the bearing sleeve, a radial bearing portion for supporting the axial member in a non-contact manner in a radial direction by an oil film of a lubricating oil formed in a radial bearing gap between the inner peripheral surface of the bearing sleeve and an outer peripheral surface of the axial member, and a seal portion for sealing the inside of the housing. In this fluid bearing device, the housing may be made of the foregoing resin material, and at least one of the bearing sleeve and a seal member composing the seal portion is fixed on the housing by welding. When only one of the bearing sleeve and the seal member is fixed by welding, a method such as insert molding, press fitting, and the like may be adopted as a method for fixing the other one on the housing.

Further the present invention provides a fluid bearing device comprising a housing, a bearing sleeve disposed inside the housing, an axial member inserted into an inner peripheral surface of the bearing sleeve, a radial bearing portion for supporting the axial member in a non-contact manner in a radial direction by an oil film of a lubricating oil formed in a radial bearing gap between the inner peripheral surface of the bearing sleeve and an outer peripheral surface of the axial member, a thrust bearing portion for supporting the axial member in a thrust direction, and a bottom member for closing the bottom of the housing. In this fluid bearing device, the housing may be made of the foregoing resin material, and at least one of the bearing sleeve and the bottom member is fixed on the housing by welding. When only one of the bearing sleeve and the bottom member is fixed by welding, a method such as insert molding, press fitting, and the like may be adopted as a method for fixing the other one on the housing.

The resin for forming the housing is not limited to particular one as long as it is a thermoplastic resin. In the case of the amorphous resin, for example, polysulfone (PSF), polyethersulfone (PES), polyphenylsulfone (PPSF), or polyetherimide (PEI) is available. In the case of the crystalline resin, for example, liquid crystal polymer (LCP), polyether ether ketone (PEEK), polybutylene terephthalate (PBT), or polyphenylene sulfide (PPS) is available.

A kind of the filler charged into the resin is not especially limited, but, for example, a fibrous filler such as glass fiber and the like, a whisker filler such as potassium titanate and the like, a scalelike filler such as mica and the like, or a fibrous or powdery conductive filler such as carbon fiber, carbon black, graphite, carbon nanomaterial, metal powder, and the like is available as the filler.

In a fluid bearing device installed in a spindle motor for a disk drive device such as a HDD and the like, for example, electrical conductivity may be required of a housing, in order to let static electricity, which is caused by friction between a disk such as an magnetic disk and the like and air, escape to a ground. In such a case, blending the foregoing conductive filler into resin forming the housing makes it possible to provide the housing with the electrical conductivity.

The carbon nanomaterial is preferable as the foregoing conductive filler, in terms of high electrical conductivity, high dispersibility in a resin matrix, high resistance to abrasive wear, low outgassing, and the like. Carbon nanofiber is preferable as the carbon nanomaterial. The carbon nanofiber includes material called "carbon nanotube," which has a diameter of from 40 nm to 50 nm.

Single-layer carbon nanotube, multilayer carbon nanotube, cup-stacked-type carbon nanofiber, vapor-phase grown carbon fiber, and the like are known as concrete examples of the carbon nanofiber, and any of them is available in the present invention. The carbon nanofiber may be used singly or by blending two or more types thereof. Furthermore, the carbon nanofiber may be blended with another filler.

According to the present invention, as described above, it is possible to reduce manufacturing cost of the housing. Furthermore, the fluid bearing device enables to disuse an adhesive in the fixation portion between the housing and the bearing sleeve and the like, so that it is possible to increase efficiency in an assembling process. Therefore, it is possible to provide the fluid bearing device at further lower cost.

According to the present invention, it is possible to restrain the occurrence of outgassing from the fixation portion between parts, and degradation of adhesion with a lapse of time. Therefore, it is possible to provide the fluid bearing device which is superior in quality and durability.

BEST MODE FOR CARRYING OUT THE INVENTION

Embodiments of the present invention will be described hereinafter.

Figure 1:
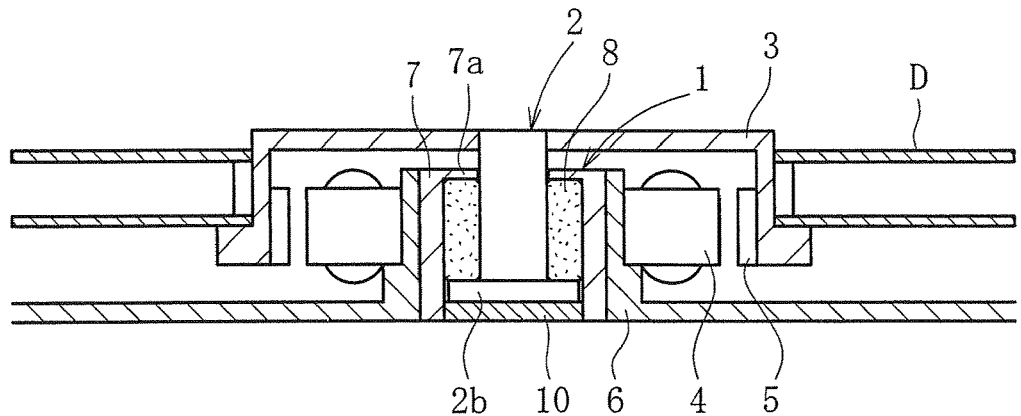
FIG. 1 is a sectional view of a spindle motor for information equipment which uses a fluid bearing device according to the present invention.

FIG. 1 schematically shows an example of the structure of a spindle motor for information equipment, in which a fluid bearing device (fluid dynamic bearing device) 1 according to this embodiment is installed. This spindle motor is used in a disk drive device such as a HDD and the like. The spindle motor is provided with the fluid bearing device 1 for ratatably supporting an axial member 2 in a non-contact manner, a rotor (disk hub) 3 attached to the axial member 2, and a stator 4 and a rotor magnet 5 which are opposed to each other with a gap in a radial direction. The stator 4 is attached to the outer periphery of a bracket 6, and the rotor magnet 5 is attached to the inner periphery of the disk hub 3. A housing 7 of the fluid bearing device 1 is attached into the inner periphery of the bracket 6. The disk hub 3 holds one or a plurality of disks D such as a magnetic disk and the like. When the stator 4 is energized, the rotor magnet 5 is rotated by electromagnetic force generated between the stator 4 and the rotor magnet 5, and hence the disk hub 3 and the axial member 2 are integrally rotated.

Figure 2:
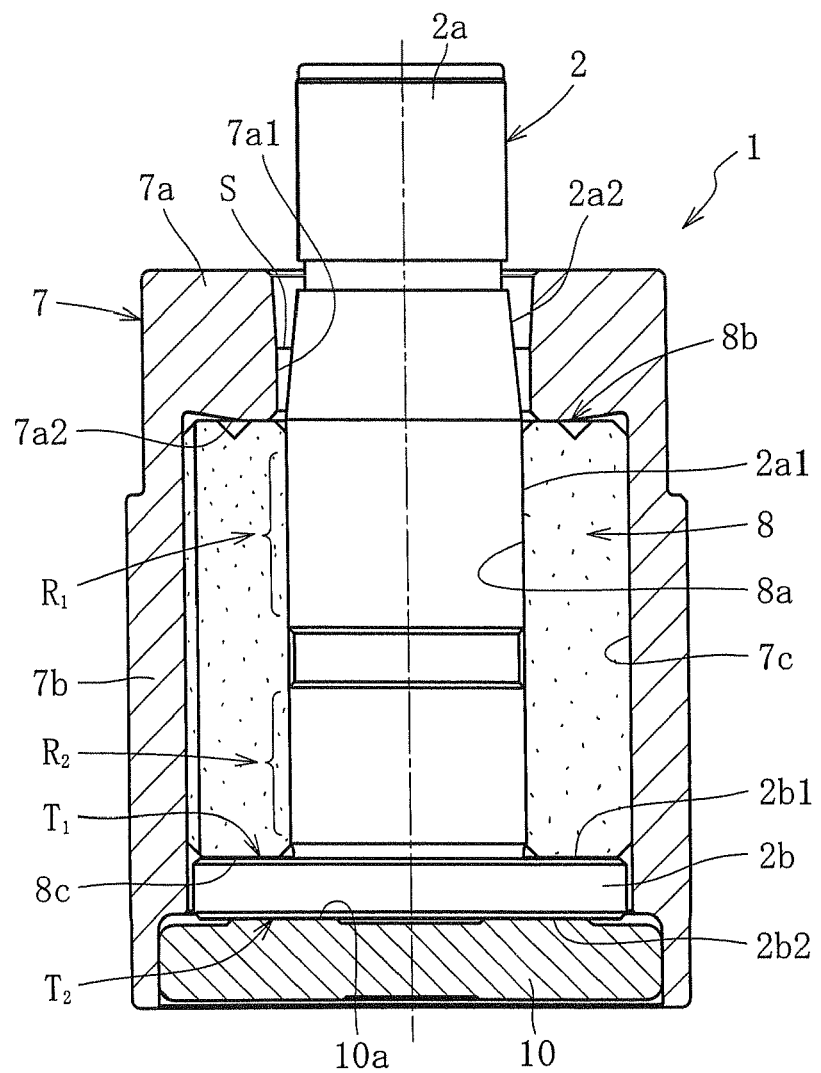
FIG. 2 is a sectional view of a fluid bearing device according to an embodiment of the present invention.

FIG. 2 shows the fluid bearing device 1. The fluid bearing device 1 comprises the housing 7, a bearing sleeve 8 and a thrust member 10 which are fixed on the housing 7, and the axial member 2.

A first radial bearing portion R1 and a second radial bearing portion R2 are provided separately in an axial direction between the inner peripheral surface 8a of the bearing sleeve 8 and the outer peripheral surface 2a1 of an axial part 2a of the axial member 2. Also, a first thrust bearing portion T1 is provided between the lower end face 8c of the bearing sleeve 8 and the upper end face 2b1 of a flange part 2b of the axial member 2. A second thrust bearing portion T2 is provided between the end face 10a of the thrust member 10 and the lower end face 2b2 of the flange part 2b. For the convenience of explanation, the side of the thrust member 10 is referred to as a lower side, and the opposite side of the thrust member 10 is referred to as an upper side in explanation below.

The housing 7 is made of resin material, which comprises a liquid crystal polymer (LCP) as crystalline resin blended with carbon nanotubes in a blending ration of 2 to 30 vol % as a conductive filler, by injection molding. The housing 7 is provided with a cylindrical side portion 7b, and a ring-shaped seal portion 7a which integrally extends from the upper end of the side portion 7b on the side of an internal diameter. The inner peripheral surface 7a1 of the seal portion 7a is opposed to a tapered surface 2a2 provided on the outer periphery of the axial part 2a across predetermined seal space S. A diameter of the tapered surface 2a2 of the axial part 2a gradually decreases in an upward direction (outward with respect to the housing 7), and the tapered surface 2a2 functions as a centrifugal force seal by the rotation of the axial member 2.

The axial member 2 is made of, for example, metal material such as stainless steel and the like. The axial member 2 is provided with the axial part 2a and the flange part 2b, which is integrally or separately provided on the lower end of the axial part 2a.

The bearing sleeve 8 is made of, for example, porous material comprising sintered metal, and more particularly, porous material of sintered metal the principal ingredient of which is copper, in the shape of a cylinder. The bearing sleeve 8 is fixed in a predetermined position on the inner peripheral surface 7c of the housing 7.

Upper and lower two regions, being radial bearing surfaces of the first radial bearing portion R1 and the second radial bearing portion R2, are provided in the inner peripheral surface 8a of the bearing sleeve 8 made of sintered metal separately in the axial direction. In each of the two regions, dynamic pressure generating grooves 13 in the shape of, for example, a herringbone are formed.

Dynamic pressure generating grooves in the shape of, for example, a spiral or a herringbone are formed in the lower end face 8c of the bearing sleeve 8, which functions as a thrust bearing surface of the first thrust bearing portion T1.

The thrust member 10, which is made of, for example, resin material or metal material such as brass and the like, is fixed to the lower end of the inner peripheral surface 7c of the housing 7. Dynamic pressure generating grooves in the shape of, for example, a herringbone or a spiral are formed in an end face 10a of the thrust member 10, which functions as a thrust bearing surface of the second thrust bearing portion T2.

The fluid bearing device 1 according to this embodiment is assembled by, for example, the following procedure.

First, the bearing sleeve 8 is inserted into the inner peripheral surface 7c of the housing 7, in such a manner that the upper end face 8b thereof makes contact with the inner surface 7a2 of the seal portion 7a. Thus, the axial position of the bearing sleeve 8 with respect to the housing 7 is determined. In this state, the bearing sleeve 8 is fixed on the housing 7 by ultrasonic welding. Since the crystalline resin in which a blending ratio of the filler is regulated in a range of 2 to 30 vol % is used as the resin material for forming the housing 7, as described above, it has the high ability of welding during the ultrasonic welding. Thus, it is possible to obtain a favorable and stable fixation state of the bearing sleeve 8. Furthermore, since the bearing sleeve 8 is made of the sintered metal of the porous material, melting resin in a joint surface of the housing 7 enters internal pores of the bearing sleeve 8 from surface openings (an area in which the internal pores of porous texture of the sintered metal are open to a surface) in a joint surface of the bearing sleeve 8, and solidifies. Because portions which have solidified in the internal pores bring the housing 7 into tightly contact with the bearing sleeve 8 by use of a kind of anchor effect, both of the housing 7 and the bearing sleeve 8 do not relatively deviate, so that it is possible to obtain a firm and stable fixation state. Since the crystalline resin has high oil resistance, degradation by a stress crack is hard to occur in the housing 7, and hence the housing 7 has favorable durability. Furthermore, since the carbon nanotubes are blended as the conductive filler, the housing 7 has electrical conductivity though it is made of resin.

Then, the axial member 2 is attached to the bearing sleeve 8. After that, the thrust member 10 is attached into the lower end of the inner periphery 7c of the housing 7 and fixed in a predetermined position. Then, they are fixed by ultrasonic welding. Since the housing 7 is made of the foregoing resin material, it has the high ability of welding during the ultrasonic welding. Thus, it is possible to obtain a favorable and stable fixation state of the thrust member 10. Providing projections and depressions in the shape of knurls, screws and the like on the outer peripheral surface of the thrust member 10 can effectively increase fixation force by welding.

When assembly is completed as described above, the axial part 2a of the axial member 2 is inserted into the inner peripheral surface 8a of the bearing sleeve 8, and the flange part 2b is contained in a space between the lower end face 8c of the bearing sleeve 8 and the end face 10a of the thrust member 10.

Then, an internal space of the housing 7 tightly sealed by the seal portion 7a, including the internal pores of the bearing sleeve 8, is filled with a lubricating oil. The oil level of the lubricating oil is maintained within the confines of a seal space S.

When the axial member 2 rotates, each of the regions (the upper and lower two regions) being the radial bearing surfaces in the inner peripheral surface 8a of the bearing sleeve 8 is opposed to the outer peripheral surface 2a1 of the axial part 2a across a radial bearing gap. The region being the thrust bearing surface in the lower end face 8c of the bearing sleeve 8 is opposed to the upper end face 2b1 of the flange section 2b across a thrust bearing gap. The region being the thrust bearing surface in the end face 10a of the thrust member 10 is opposed to the lower end face 2b2 of the flange part 2b across a thrust bearing gap. Dynamic pressure of the lubricating oil is generated in the foregoing radial bearing gaps in accordance with the rotation of the axial member 2, and hence oil films of the lubricating oil formed in the foregoing radial bearing gaps support the axial part 2a of the axial member 2 in a non-contact manner rotatably in the radial direction. Thus, the first radial bearing portion R1 and the second radial bearing portion R2 for supporting the axial member 2 in a non-contact manner rotatably in the radial direction are configured. At the same time, dynamic pressure of the lubricating oil is generated in the foregoing thrust bearing gaps, and hence oil films of the lubricating oil formed in the foregoing thrust bearing gaps support the flange part 2b of the axial member 2 in a non-contact manner rotatably in both thrust directions. Thus, the first thrust bearing portion T1 and the second thrust bearing portion T2 for supporting the axial member 2 in a non-contact manner rotatably in the thrust direction are configured.

In the foregoing structure, only one of the bearing sleeve 8 and the thrust member 10 may be fixed on the housing 7 by welding, and the other may be fixed by means except for welding such as, for example, insert molding, press fitting, and the like. The housing 7 may be made of amorphous resin blended with a filler in a blending ratio of 3 to 35 vol %.

Figure 3:
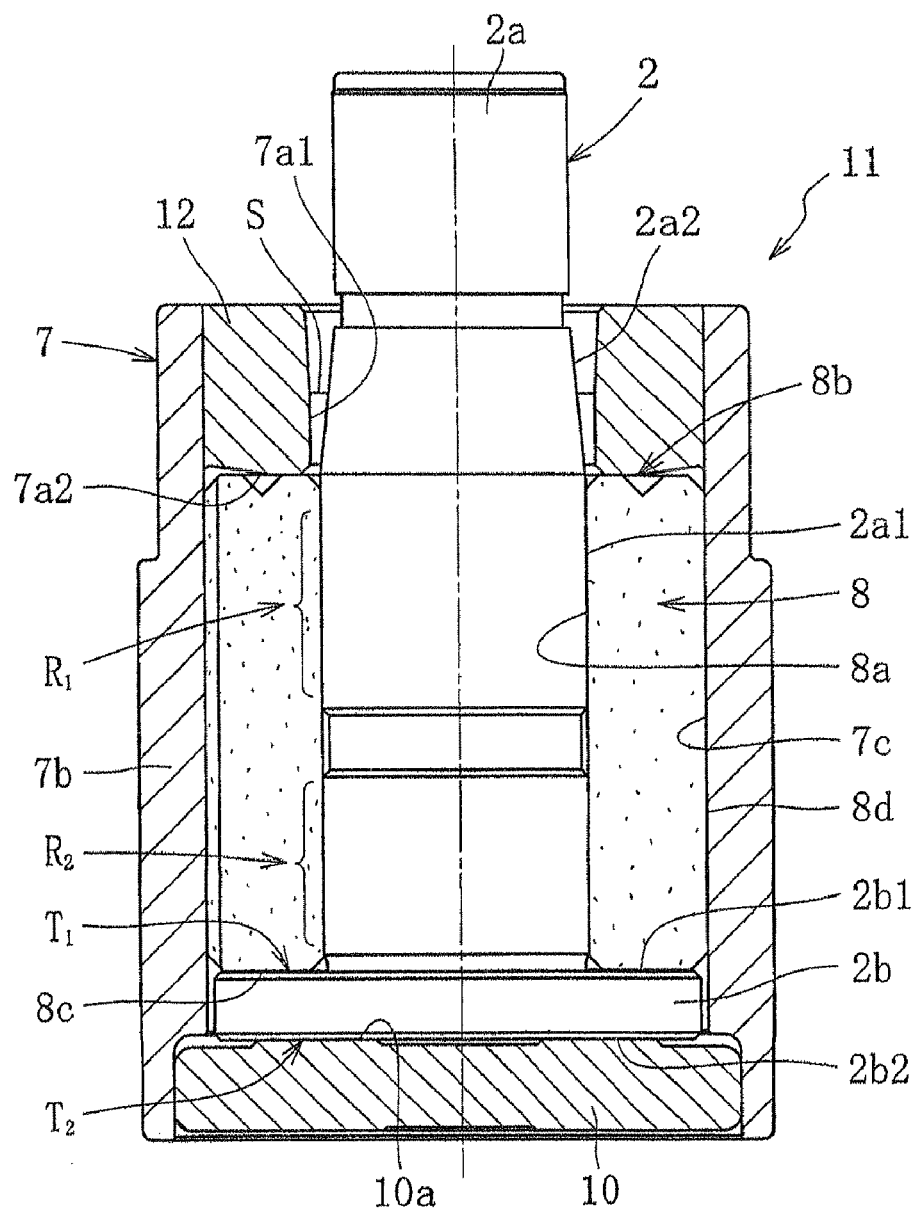
FIG. 3 is a sectional view of a fluid bearing device according to another embodiment of the present invention.

FIG. 3 shows a fluid bearing device 11 according to another embodiment. The substantial differences between the fluid bearing device 11 according to this embodiment and the fluid bearing device 1 shown in FIG. 2 are that the seal portion is composed of a separate seal member 12, and the seal member 12 is fixed on the upper end of the inner peripheral surface 7c of the housing 7 by welding. The seal member 12 made of, for example, metal material or resin material is welded to a joint surface of the housing 7 by ultrasonic welding. The inner peripheral surface 12a of the seal member 12 is opposed to the tapered surface 2a2 provided on the outer periphery of the axial part 2a across a predetermined seal space S. The seal member 12 may be fixed on the housing 7 by means except for welding such as, for example, insert molding (in a case that the seal member 12 is made of metal material), press fitting, and the like. The other matters are the same as the foregoing embodiment, and hence duplicate explanation is omitted.

In a case that the seal portion is composed of the separate seal member, if the housing is made of the foregoing resin material in the shape of a cylinder with a bottom, and a thrust bearing surface for structuring the second thrust bearing portion T2 is provided in the inner bottom face of the bottom of the housing, it is possible to omit the thrust member. In this case, the dynamic pressure generating grooves formed in the thrust bearing surface can be molded at the same time as the molding of the housing (a molding portion for molding the dynamic pressure generating grooves is formed in a mold for molding the housing).

Figure 4:
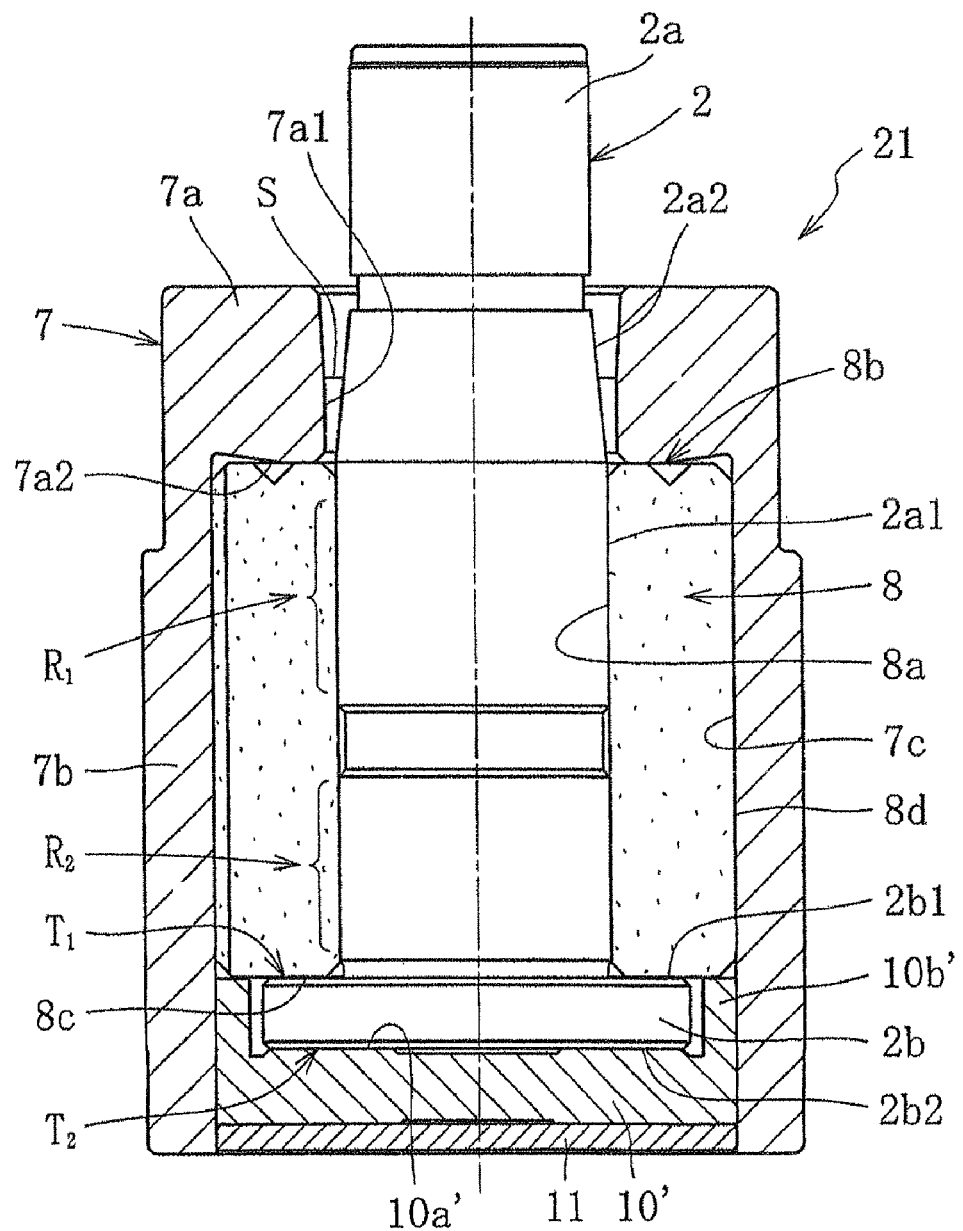
FIG. 4 is a sectional view of a fluid bearing device according to further another embodiment of the present invention.

FIG. 4 shows a fluid bearing device 21 according to further another embodiment. The substantial difference between the fluid bearing device 21 according to this embodiment and the fluid bearing device 1 shown in FIG. 2 is that a bottom member 11 for closing an opening of the bottom of the housing 7 is fixed on the bottom end of the inner peripheral surface 7c of the housing 7 by welding after a thrust member 10' is attached to the bottom end.

In this embodiment, the thrust member 10' is integrally provided with a ring-shaped contact portion 10b', which extends upward from the outer peripheral edge of an end face 10a' of the thrust member 10'. The upper end face of the contact portion 10b' makes contact with the lower end face 8c of the bearing sleeve 8, and the inner peripheral surface of the contact portion 10b' is opposed to the outer peripheral surface of the flange part 2b across a gap.

The bottom member 11 is made of, for example, resin material. The top face of the bottom member 11 makes contact with the bottom face of the thrust member 10'.

After the bearing sleeve 8 and the axial member 2 are assembled in the manner described above, the thrust member 10' is inserted into the lower end of the inner peripheral surface 7c of the housing 7 and the upper end face of the contact section 10b' makes contact with the lower end face 8c of the bearing sleeve 8. Thus, the axial position of the thrust member 10' with respect to the bearing sleeve 8 is determined. By controlling axial dimensions of the contact portion 10b' and the flange part 2b, it is possible to set the thrust bearing gaps of the first thrust bearing portion T1 and the second thrust bearing portion T2 with high accuracy. Then, the bottom member 11 is attached to the lower end of the inner peripheral surface 7c, in such a manner that the top face of the bottom member 11 makes contact with the bottom face of the thrust member 10'. In this state, the bottom member 11 is fixed on the housing 7 by ultrasonic welding. The other matters are the same as the foregoing embodiment, and hence duplicate explanation is omitted.

The present invention can be applied in a like manner to a fluid bearing device which adopts a so-called pivot bearing as the thrust bearing portion, or a fluid bearing device which adopts a so-called cylindrical bearing as a radial bearing portion.

As to dynamic bearing devices having the structure shown in FIG. 4, the ability of welding in a welded portion between the housing 7 and the bottom member 11 (hereinafter simply called "welded portion") is evaluated, with the use of dynamic bearing devices in which the housing 7 and the bottom member 11 made of LCP being crystalline resin are fixed to each other by ultrasonic welding (Examples 1 to 4, Comparative Example 1), and dynamic bearing devices in which the housing 7 and the bottom member 11 made of PES being amorphous resin are fixed to each other by ultrasonic welding (Examples 5 to 7, Comparative Examples 2 and 3). In each of the Examples and Comparative Examples, a filler is blended into resin forming the housing 7 and the bottom member 11 in a blending ratio shown in tables 1 and 2, so that each volume resistibility becomes $10^6 \Omega \cdot cm$.

The ability of welding is rated on a scale of ○ (good), Δ (slightly inferior), and x (inferior) in regard to the following evaluation items. Tables 1 and 2 show the results of the evaluation.

TABLE 1

| | Crystalline resin (LCP) | | | | |
|---|---|---|---|---|---|
| | Example 1 | Example 2 | Example 3 | Example 4 | Comparative Example 1 |
| Blending ratio | 29 | 25 | 23 | 15 | 34 |

TABLE 1-continued

| | Crystalline resin (LCP) | | | | |
|---|---|---|---|---|---|
| | Example 1 | Example 2 | Example 3 | Example 4 | Comparative Example 1 |
| of filler (vol %) | | | | | |
| Strength of welded portion (%) | 51 | 71 | 80 | 93 | 31 |
| Sealability | ○ | ○ | ○ | ○ | Δ |
| Leakage of oil | ○ | ○ | ○ | ○ | Δ |
| Thermal shock | ○ | ○ | ○ | ○ | — |

TABLE 2

| | Amorphous resin (PES) | | | | |
|---|---|---|---|---|---|
| | Example 5 | Example 6 | Example 7 | Comparative Example 2 | Comparative Example 3 |
| Blending ratio of filler (vol %) | 33 | 28 | 20 | 38 | 43 |
| Strength of welded portion (%) | 51 | 71 | 80 | 43 | 35 |
| Sealability | ○ | ○ | ○ | ○ | Δ |
| Leakage of oil | ○ | ○ | ○ | X | X |
| Thermal shock | ○ | ○ | ○ | — | — |

[Strength of Welded Portion]

The strength of the welded portion in complete welding is calculated from material properties of the resin, which forms the housing 7 and the bottom member 11, and a tab for welding (calculated value). Also, the strength of the welded portion is actually measured (measured value). The measured value is divided by the calculated value to obtain a strength percentage of the welded portion, and the strength of the welded portion is evaluated by use of the strength percentage.

[Sealability]

The sealability of the welded portion is evaluated by an He leak tester.

[Leakage of Oil]

The leakage of oil from the welded portion is mainly caused by a stress crack due to residual stress applied to the welded portion. After the bottom member 11 is welded to the housing 7, the internal space of the housing 7 is filled with diester oil. After holding the dynamic bearing device for six hours at an ambient temperature of 70 degrees Celsius, the presence or absence of the leakage of oil from the welded portion and the degree thereof are visually confirmed.

[Thermal Shock]

Resistance to thermal shock of the welded portion is evaluated. As in the case of an oil-leakage test, after the bottom member 11 is welded to the housing 7, the internal space of the housing 7 is filled with diester oil. Then, the dynamic bearing device is held for one hour at an ambient temperature of −40 degrees Celsius, and is held for another one hour at an ambient temperature of 100 degrees Celsius. This cycle is repeated for 20 times, and then thermal shock is applied. After that, the leakage of oil from the welded portion is visually confirmed.

According to the foregoing evaluation tests, the Examples 1 to 7 obtained good results with respect to each of the evaluation items of the strength of the welded portion, the sealability, the leakage of oil, and the thermal shock. The Comparative Examples 1 and 3 could not obtain satisfied results with respect to each of the evaluation items of the strength of the welded portion, the sealability, and the leakage of oil. The Comparative Example 2 obtained a good result with respect to the sealability, but could not obtain satisfied results with respect to each of the evaluation items of the strength of the welded portion, and the leakage of oil. As for the Comparative Examples 1 to 3, a thermal shock test was not carried out because they did not show satisfied results in the oil-leakage test.

The invention claimed is:

1. A fluid bearing device comprising:
a housing,
a bearing sleeve disposed inside the housing,
an axial member inserted into an inner peripheral surface of the bearing sleeve, and
a radial bearing portion for supporting the axial member in a non-contact manner in a radial direction by an oil film of a lubricating oil formed in a radial bearing gap between the inner peripheral surface of the bearing sleeve and an outer peripheral surface of the axial member,
wherein the bearing sleeve is made of a sintered metal, an internal space of the housing is filled with the lubricating oil, the housing is made of an amorphous resin blended with a filler in a blending ratio of 3 to 35 vol %, and the bearing sleeve is fixed to the housing by welding.

2. The fluid bearing device according to claim 1, further comprising a thrust bearing portion for supporting the axial member in a thrust direction, wherein a thrust member of the thrust bearing portion is fixed to the housing by welding.

3. The fluid bearing device according to claim 2, wherein the filler is conductive material.

4. The fluid bearing device according to claim 3, wherein the conductive material is carbon nanomaterial.

5. The fluid bearing device according to claim 1, further comprising a seal portion for sealing the inside of the housing, wherein a seal member of the seal portion is fixed to the housing by welding.

6. The fluid bearing device according to claim 5, wherein the filler is conductive material.

7. The fluid bearing device according to claim 6, wherein the conductive material is carbon nanomaterial.

8. The fluid bearing device according to claim 1, wherein the amorphous resin is one resin selected from the group consisting of polysulfone (PSF), polyethersulfone (PES), polyphenylsulfone (PPSF), and polyetherimide (PEI).

9. The fluid bearing device according to claim 1, wherein the filler is conductive material.

10. The fluid bearing device according to claim 9, wherein the conductive material is carbon nanomaterial.

11. The fluid bearing device according to claim 1, further comprising a bottom member for closing a bottom of the housing, wherein the bottom member is fixed to the housing by welding.

* * * * *